(No Model.) 2 Sheets—Sheet 1.

J. H. GREEN.
MACHINE FOR WORKING FIRE CLAY.

No. 353,448. Patented Nov. 30, 1886.

Witnesses:
F. A. Hopkins
Geo. S. Wheelock

Inventor:
James H. Green.
By Knight Bro.
Attys.

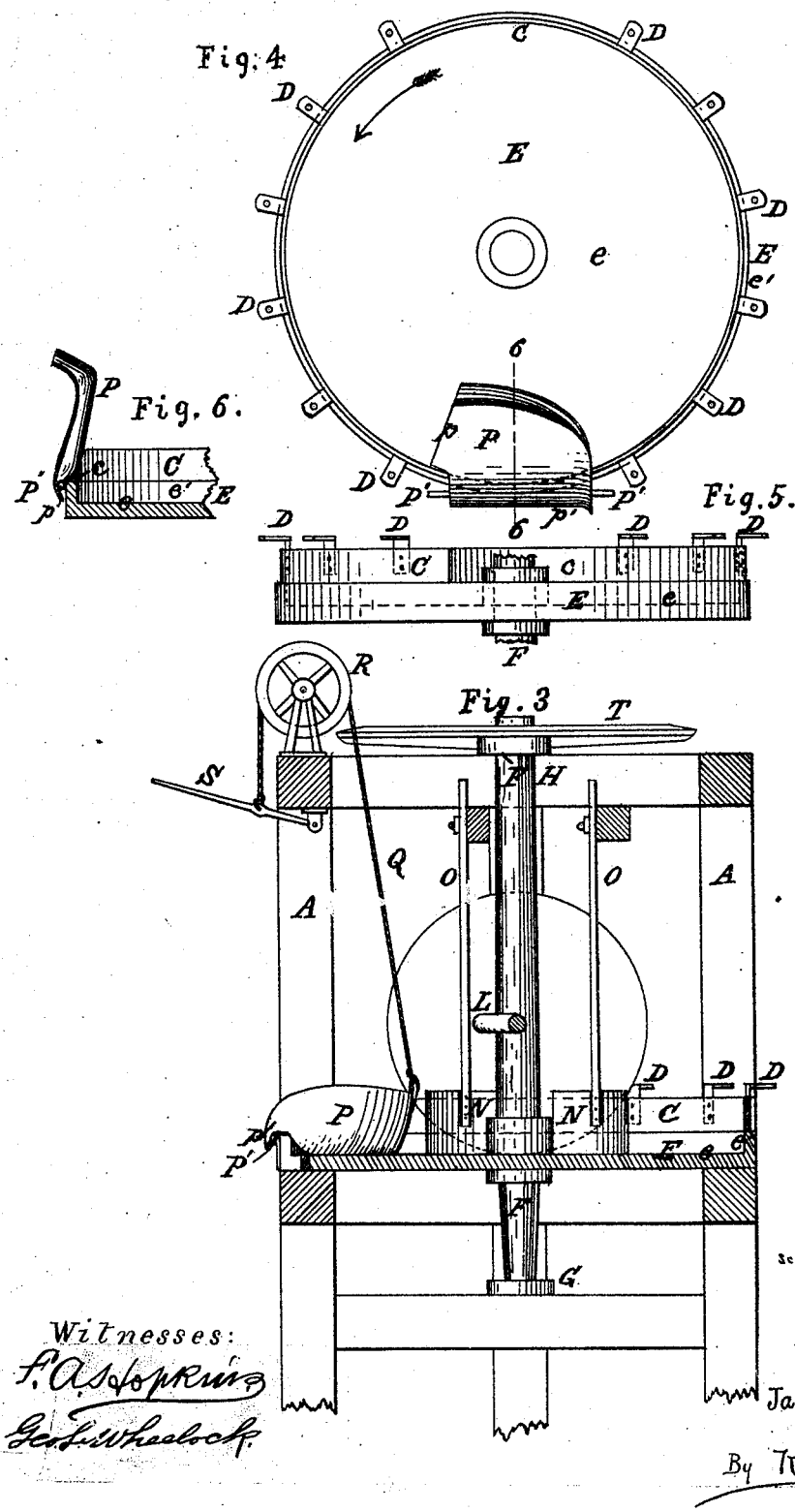

UNITED STATES PATENT OFFICE.

JAMES H. GREEN, OF ST. LOUIS, MISSOURI.

MACHINE FOR WORKING FIRE-CLAY.

SPECIFICATION forming part of Letters Patent No. 353,448, dated November 30, 1886.

Application filed April 3, 1886. Serial No. 197,668. (No model.)

*To all whom it may concern:*

Be it known that I, JAMES H. GREEN, of the city of St. Louis, in the State of Missouri, have invented a certain new and useful Improvement in Machines for Working Fire-Clay, &c., of which the following is a full, clear, and exact description, reference being had to the accompanying drawings, forming part of this specification, and in which—

Figure 1:
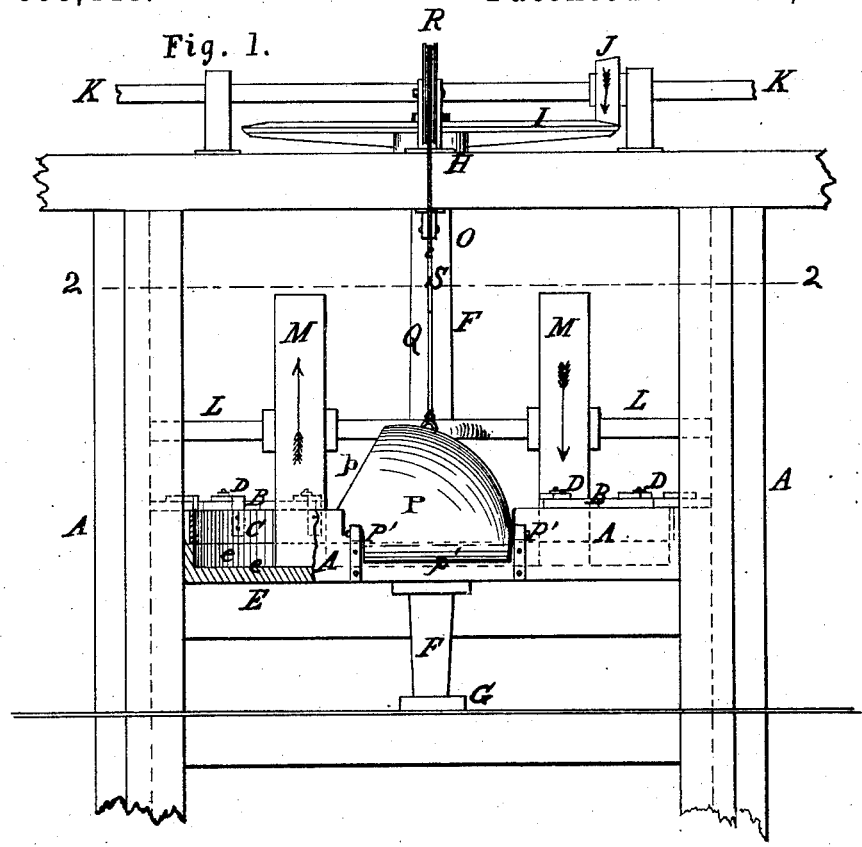
Figure 2:
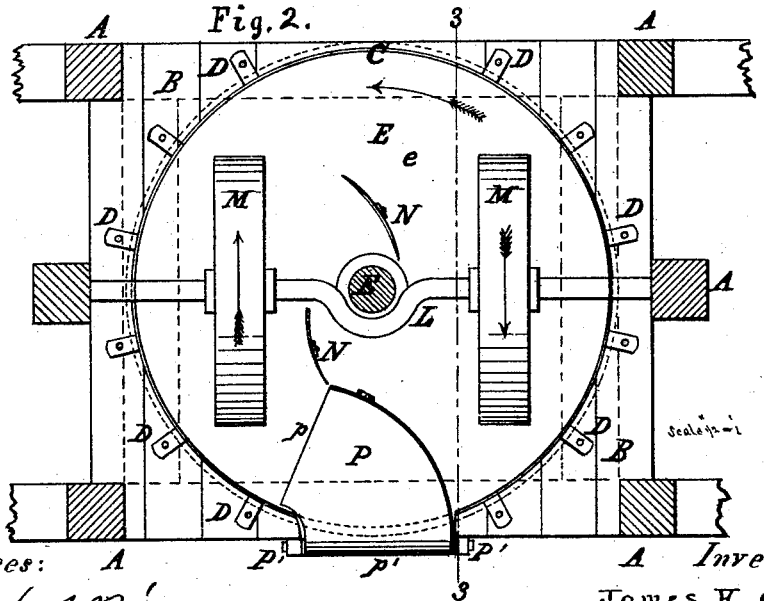

Figure 1 is a side view, partly in section, showing my improvement. Fig. 2 is a horizontal section at 2 2, Fig. 1. Fig. 3 is a vertical section at 3 3, Fig. 2. Fig. 4 is a top view of the pan and shovel, showing the latter in its elevated position. Fig. 5 is a side view of the pan. Fig. 6 is a vertical section at 6 6, Fig. 4.

The improvement is applied partly to the pan, which is made in two parts, the lower of which is made to rotate and the upper one of which is fixed. The improvement also applies to the construction of pan, in connection with the discharging scoop or shovel.

A is the main frame, which may have any suitable construction.

B is a floor, to which the upper and fixed member, C, of the circular pan is fixed by brackets D and bolts or spikes. The under or bottom member, E, of the pan, as shown, has a flat bottom, $e$, and upright sides $e'$, which agree in interior diameter with the upper member, C; but I do not wish to confine myself to a pan with a bottom, $e$, flat or vertical sides $e'$, although this is the form I have used and prefer. The bottom E is supported on a vertical shaft, F, having bearing in a step, G, at the lower end, and box H near the upper end.

I is a bevel cog-wheel fixed to the shaft F, and J is a bevel-pinion fixed to the drive-shaft K.

L is an axle-bar extending diametrically over the pan, and forming the axle on which turn the two mixing-wheels M, the said wheels being turned by the friction of the pan and clay.

N are guides by which, as the pan-bottom turns, the clay is moved outward toward the wheels M. These guides are shown connected by standards O to the frame of the machine. Other guides may be used to move the clay inward beneath the wheels.

$c$ is a gap in the fixed member C of the pan.

P is a scoop or shovel supported on a hinge, P', so that it may be dropped down upon the pan-bottom $e$, as shown in Figs. 2 and 3, or raised up into the position shown in Figs. 1, 4, and 6. The scoop has an edge, $p$, which lies flat upon the bottom $e$ when the pan is down, and an open spout, $p'$, through which the clay is discharged when the scoop is in this position, the scoop being made with a curve and inclined bottom, so that the clay passing over the edge $p$ will be turned radially and discharged, as set forth.

Q is a cord or chain attached to the inner side of the scoop, said cord passing over a pulley, R, to a hand-lever, S, so that by drawing down the free end of the lever the scoop is thrown up into the position shown in Figs. 1, 4, and 6, which is the position occupied by the scoop when the clay is being tempered. When the scoop is raised, it stops the gap $c$ in the ring or upper member, C, of the pan. (See Figs. 1 and 6.) After the clay has been sufficiently tempered, the scoop P is allowed to drop into the pan, and the continued rotation of the pan-bottom E forces the clay out through the scoop. When the pan is made in one piece, of course the material must be lifted by the scoop over the top of the pan.

Among the advantages of having the pan made with an upper fixed part may be mentioned that it gives means for locating the discharging-spout of the scoop so low that the clay passes readily over the scoop; that there is not so much liability of the clay escaping over the top from centrifugal force; that the mixing power of the pan is increased, as the clay adheres to both the fixed and rotating part, and so abrasion and mixing takes place from this cause.

I claim as my invention—

1. The mixing-pan composed of a rotating bottom part and a fixed upper part, substantially as set forth.

2. The fixed upper part, C, of the pan, having a gap, $c$, with discharging-scoop occupying the gap.

3. The combination of a rotating pan-bottom, E, and a tilting scoop hinged at the side of the pan, substantially as and for the purpose set forth.

4. The combination of a pan formed of a rotating lower part and a fixed upper part, and the tilting scoop located in a gap of the fixed part.

5. The combination of sectional pan C E, guides N, mixing-wheels M, and tilting scoop P, all constructed and arranged substantially as set forth.

JAMES H. GREEN.

Witnesses:
SAML. KNIGHT,
A. A. KNIGHT.